US006192687B1

(12) United States Patent
Pinkerton et al.

(10) Patent No.: US 6,192,687 B1
(45) Date of Patent: Feb. 27, 2001

(54) UNINTERRUPTIBLE POWER SUPPLY UTILIZING THERMAL ENERGY SOURCE

(75) Inventors: Joseph F. Pinkerton, Austin; David B. Clifton, Leander, both of TX (US)

(73) Assignee: Active Power, Inc., Austin, TX (US)

( * ) Notice: Subject to any disclaimer, the term of this patent is extended or adjusted under 35 U.S.C. 154(b) by 0 days.

(21) Appl. No.: 09/320,435

(22) Filed: May 26, 1999

(51) Int. Cl.[7] .................................................... F01K 13/02
(52) U.S. Cl. ................................................. 60/646; 60/657
(58) Field of Search ............................ 60/646, 657, 659

(56) References Cited

U.S. PATENT DOCUMENTS

| | | |
|---|---|---|
| 3,848,416 | 11/1974 | Bundy . |
| 4,089,744 | 5/1978 | Cahn . |
| 4,094,148 | 6/1978 | Nelson . |
| 4,096,699 * | 6/1978 | Zitelli ..................................... 60/657 |
| 4,110,987 | 9/1978 | Cahn et al. . |
| 4,132,076 * | 1/1979 | Weiss .................................. 60/657 X |
| 4,428,190 | 1/1984 | Bronicki . |
| 4,989,405 | 2/1991 | Duffy et al. . |
| 5,047,654 | 9/1991 | Newman . |
| 5,536,976 | 7/1996 | Churchill . |
| 5,845,496 * | 12/1998 | Bachmann ............................... 60/646 |

* cited by examiner

Primary Examiner—Hoang Nguyen
(74) Attorney, Agent, or Firm—Fish & Neave; Robert W. Morris

(57) ABSTRACT

Uninterruptible power supplies are provided that utilize a material to provide a source of thermal energy that may be converted to electrical energy to produce backup electrical power for a load. In some embodiments, a hot tank assembly is utilized to hold a liquid heated to a predetermined temperature. A closed-loop pipe containing, water for example, is immersed in the heated liquid. Upon the loss of primary power, the water flows into the heat exchanger where it is raised above its boiling temperature. The steam is then passed to a heat engine (e.g., a turbine-based system) that converts the heated steam to mechanical energy by causing the heat engine rotor to rotate. A generator is physically coupled to the heat engine so that the rotation of the heat engine rotor drives the generator. The generator produces AC power which is converted to DC and again back to AC before being provided to the load. In other embodiments, a solid mass, such as a block of iron, is heated to a predetermined temperature. The heat from the solid material is then converted to electrical energy for the load.

49 Claims, 15 Drawing Sheets

UNINTERRUPTIBLE POWER SUPPLY UTILIZING THERMAL ENERGY SOURCE

BACKGROUND OF THE INVENTION

This invention relates to uninterruptible power supplies that include a thermal energy source as a back-up energy source. More particularly, the power supplies of the present invention include a material that is heated and maintained at an elevated temperature during standby operations. In the event of a failure of the primary power source, such as utility power, the stored thermal energy is converted into electricity that provides the necessary back-up power until the primary supply comes back on line.

Uninterruptible power supplies (UPS) are well known. Such devices often are used to provide a nominal amount of power for a certain time period so that various pieces of equipment utilizing primary power may be shut down in a relatively normal fashion, rather than the instantaneous shut-down that would occur from a loss of primary power without a backup supply. One known configuration for a UPS is to provide a bank of chemical batteries as a short-term, secondary power source. The batteries often are combined with an emergency generator that provides long-term secondary power.

Chemical batteries suffer from various deficiencies including bulkiness, lack of reliability, limited lifespan (typically requiring replacement every 3–8 years), high maintenance costs and relatively low safety. For example, chemical batteries require relatively constant and complex recharging, depending on the type of batteries involved to insure that the batteries continue to operate efficiently and maintain their full storage capacity. Even well maintained batteries, however, may be unreliable due to a relatively high sensitivity to temperature. Additionally, chemical batteries raise various safety considerations due to the general nature of the large quantities of toxic and caustic chemicals involved. Typical large battery installations often require special venting and air-conditioning systems for the dedicated battery storage rooms.

In view of the foregoing, it is an object is of this invention to provide improved uninterruptible power supplies that provide back-up power from a thermal source of energy.

It is also an object of the present invention to provide improved uninterruptible power supplies that are relatively insensitive to ambient temperature variations while providing back-up power.

It is an additional object of the present invention to provide improved uninterruptible power supplies that have reduced maintenance requirements.

It is a still further object of the present invention to provide improved uninterruptible power supplies that have an essentially unlimited life cycle.

SUMMARY OF THE INVENTION

These and other objects of the invention are accomplished in accordance with the principles of the invention by providing various uninterruptible power supplies that utilize stored thermal energy to provide back-up power. The preferred embodiments include a material that is heated to store energy. That material may be either at least one vessel which stores a liquid that is heated or a solid mass, such as a block of iron, that is heated. The material may be heated utilizing various different methods, such as resistance heating or using a boiler to heat fluid that is circulated in a closed loop from the vessel to the boiler, or resistance heating to heat the solid mass.

When primary power, such as utility power, is present, the primary power may be used to heat a resistor immersed in the fluid within the vessel or a resistor in thermal contact with the solid mass. The resistor then heats the material to keep it at a predetermined temperature, such as between 150 and 300 degrees Celsius for the liquid, or between 150 and 1000 degrees Celsius for the solid. Alternately, in the fluid embodiments, the fluid in the vessel may be circulated through a boiler which may be powered, for example, by fuel from a utility gas line or external fuel tank, or both. Power from the utility also may be used to power a generator as a motor so that it is spinning at all times—this will enable the system to provide almost instantaneous back-up power in the event of a loss of primary power.

The heat engines utilized to drive the generator in the various UPS embodiments of the present invention may be mechanical heat engines, such as a steam engine or Stirling engine. Instead, they may be thermionic or thermoelectric heat engines that generate DC power directly from the stored thermal energy. If a steam engine configuration is utilized, the engine may be a turbine or reciprocating engine without departing from the scope of the invention. One particular type of steam turbine that may be used is an expander wheel that drives a shaft that drives the generator.

In some instances, a fluid, such as water, passes through pipes placed within the vessel. The heated fluid transfers heat to the fluid in the closed loop pipe so that the fluid is heated. It may be preferable for efficiency to heat the fluid above its boiling point so that, for example, water turns into steam, however, persons skilled in the art will appreciate that the principles of the present invention may be practiced without a phase change occurring. The resultant steam is used to drive either the heat engine or a turbine connected to the generator (the expander changes the pressure of the steam from high to low, which drives the turbine). In other instances, the heat from the material may be transferred directly from the vessel or solid mass to the heat engine.

A further advantage of the present invention is realized from the turbine rotor itself, which is constantly rotated when utility power is present by the utility power itself (thus, during stand-by mode, the generator is operated as a motor). Additional improvements in reliability may be provided by utilizing magnetic bearings, preferably active bearings, to alleviate substantially all of the weight from the rotor so that the rotor may spin continuously at high speeds without wear. The rotating heat engine rotor, which may be rotated from about 20–50 k RPM, provides an additional source of stored energy, in this case kinetic energy, that may be used to provide power to the critical load during the period that the heat flow is increased.

Additional advantages of the present invention may be obtained by including a condenser or liquid cooling tank in the water/steam loop. The condenser or cooling tank, if used, cools the steam from the expander wheel into water for re-circulation back into the heating vessel. If a condenser is used, it may also be preferred to utilize a radiator that operates to offload the heat from the condenser. A choice between a conventional condenser and modified condenser that includes a cooling tank is preferably made depending on the desired runtime of the system. For example, if the back-up system is designed for a relatively short duration, such as 15–20 minutes (in which case another back-up power source would likely be used, such as an external diesel engine-generator), the cooling tank configuration may be used. If, on the other hand, the thermal back-up system is designed to run until utility power returns, then it would be preferable to utilize the conventional condenser/radiator combination.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
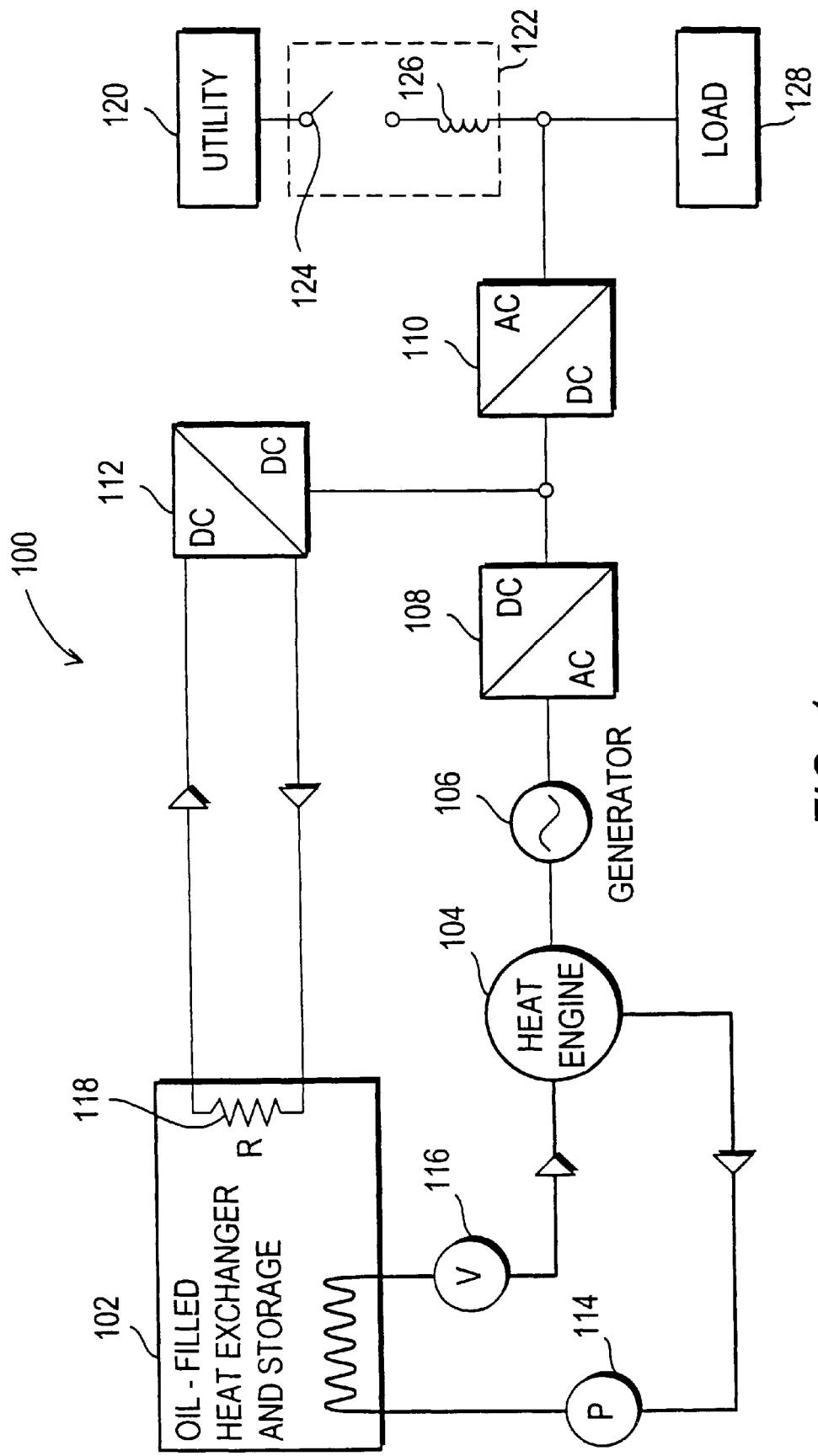
FIG. 1 is a schematic diagram of an uninterrupible power supply (UPS) that includes a thermal energy source constructed in accordance with the principles of the present invention.

FIG. 1 shows a schematic diagram of a thermal energy source-based uninterruptible power supply 100 (UPS 100) constructed in accordance with the principles of the present invention. UPS 100 is shown to include several components, however, persons skilled in the art will appreciate that the principles of the present invention may be accomplished using any of the specific configurations described herein, other combinations of those configurations, or even configurations utilizing other components without departing from the spirit of the present invention.

UPS 100 includes a thermal energy storage unit 102—in this instance, an oil-filled heat exchanger and storage unit, which hereinafter are referred to collectively as hot tank assembly 102—heat engine 104, generator 106, AC-to-DC converter 108, DC-to-AC converter 110, DC-to-DC converter 112, pump 114, valve 116, resistive heater 118, primary power source 120—in this case, utility power—and regulation circuitry 122 (which includes switch 124 and inductor 126), which all operate to provide power to load 128. The converters described herein may be provided as conventional converters, an array of high power semiconductor switches, or other circuitry without departing from the present invention.

Figure 2:
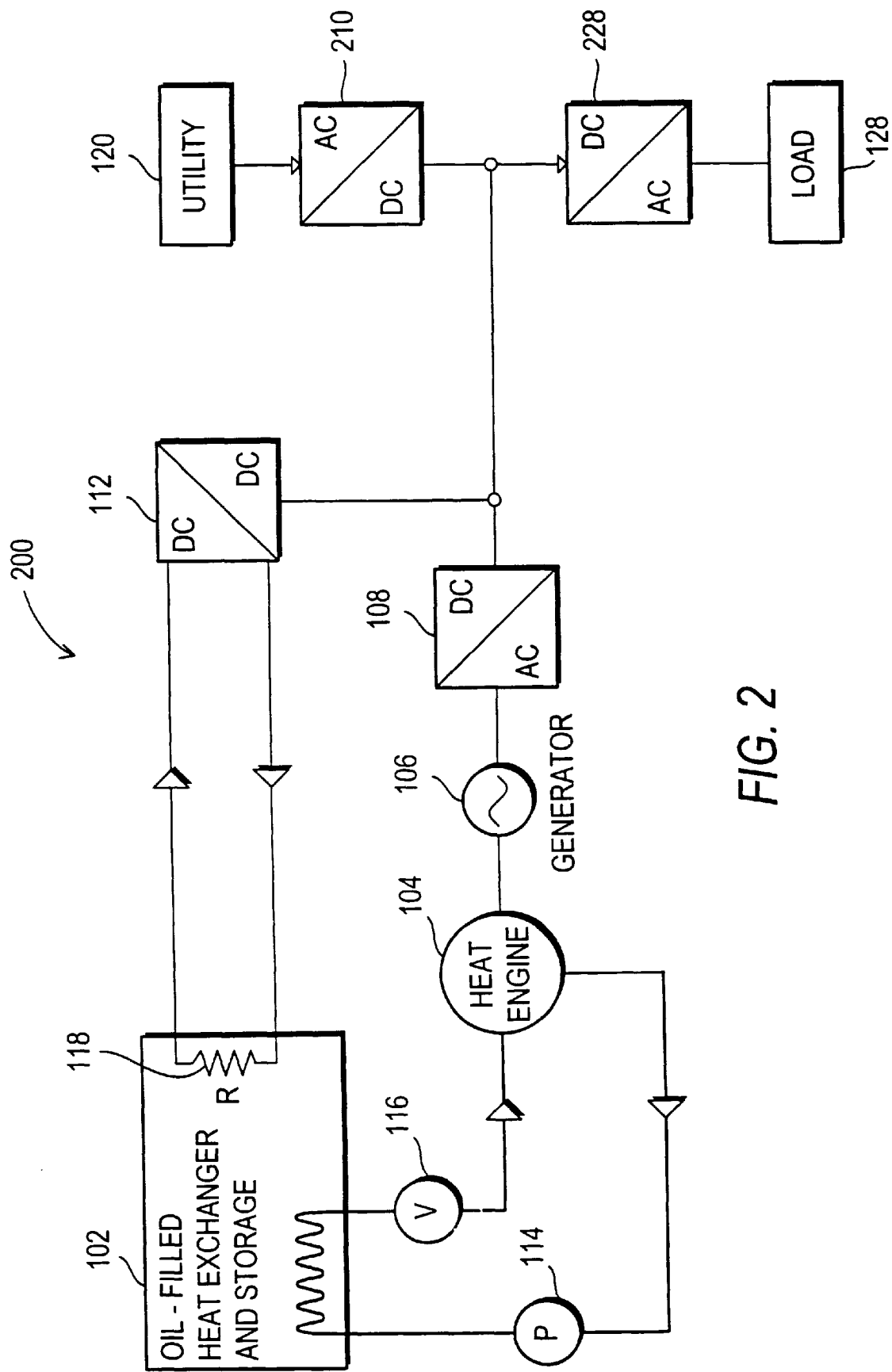
FIG. 2 is a schematic diagram of another UPS that includes a thermal energy source constructed in accordance with the principles of the present invention.

FIG. 2 shows a schematic of a thermal energy source-based UPS 200 that also is constructed in accordance with the principles of the present invention. UPS 200 is substantially similar to UPS 100, except that UPS 200 adds a second level of conversion through the use of relocated AC-to-DC converter 210 (converter 210 may be substantially similar to converter 110, except that it is configured to provide power directly to the DC buss from utility 120), and DC-to-AC converter 228. The configuration of FIG. 2 converts utility power from AC to DC and then back to AC before providing it to load 128. The configuration shown in FIG. 1, on the other hand, provides regulated AC power directly from the utility to the load via regulation circuitry 122. Each configuration has advantages and disadvantages, as will be apparent to those skilled in the art. For example, the single conversion topology of FIG. 1 provides higher efficiency and reduced costs (one less converter is required) than the topology of FIG. 2, which itself provides improved long term voltage and frequency regulation when compared to the circuitry of FIG. 1.

UPS 100 and UPS 200 operate in accordance with the principles of the present invention as follows. During normal operations when utility power is available, utility 120 provides AC power to load 128 (either through regulation circuitry 122 or converters 210 and 228). At the same time, AC utility power is converted to DC (by converter 110 or converter 210, as appropriate) and provided to the DC buss. The DC power is provided to resistor 118 via DC buss terminal 112 (which may be a DC-to-DC converter or other known circuitry). Resistor 118, which is immersed in a tank of fluid, such as oil, heats the fluid to a predetermined temperature, such as between 150 and 300 degrees C. Alternatively, a solid mass such as an iron mass may be thermally coupled to resistor 118 so that resistor 118 heats the solid mass—in that case, the solid mass could be heated to a higher temperature, such as between 150 and 1000 degrees C. Thermal energy may also be extracted from a material as it transitions from a liquid to a solid. For example, hot tank 102 can be filled with molten aluminum that is maintained at approximately 670 degrees C by resistor 118 when a primary source of power is available. When the primary source of electrical power fails, the molten aluminum would cool and start to solidify, thus releasing its heat of fusion energy at a substantially constant temperature. The heat of fusion so released is ultimately used to power critical load 128. Power from the DC buss may also be provided to generator 106 via converter 108 (in which case converter 108 would provide DC-to-AC conversion) to rotate generator 106 as a motor so that it is preferably spinning at all times.

When power from utility 120 fails, thermal energy stored in hot tank assembly 102 is converted to electric power and fed to the DC buss via AC-to-DC converter 108. In the topology of FIG. 1, switch 124 would remain OPEN until power is once again supplied from utility 120 or an emergency engine-generator (not shown). The conversion of thermal energy to electrical energy is accomplished by providing a fluid, preferably water, in a closed-loop pipe that is placed in the heated fluid of hot tank assembly 102. The flow rate of the water and thus the supply of heat to heat engine 104 is increased by pump 114 and valve 116 when the UPS is providing backup power.

Heat engine 104, which may be a conventional steam engine (e.g., a turbine engine or a reciprocating engine), or a Stirling engine that drives generator 106 and causes it to produce AC power. In either case, AC power is converted to DC by AC-to-DC converter 108 which then is provided as AC power to load 128, through DC-to-AC converter 110 or DC-to-AC converter 228 (depending on whether the configuration of FIG. 1 or FIG. 2 is utilized). Alternatively, the functions of heat engine 104 and generator 106 may be accomplished by a thermoelectric or thermionic generator, such as that shown in FIG. 6B, that converts heat directly to DC electric power so that generator 106 and converter 108 are not necessary. This DC electric power may be converted to AC to power AC loads or may be used directly by mission critical DC loads, such as those found in mobile phone transmission towers.

When power returns from utility 120, the flow of hot liquid or gas through heat engine 104 is stopped by valve 116 and utility power is once again converted to DC power and provided to heat resistor 118. Thus, the fluid in hot tank assembly 102 is increased back to its predetermined temperature and maintained there until the next outage.

Figure 3:
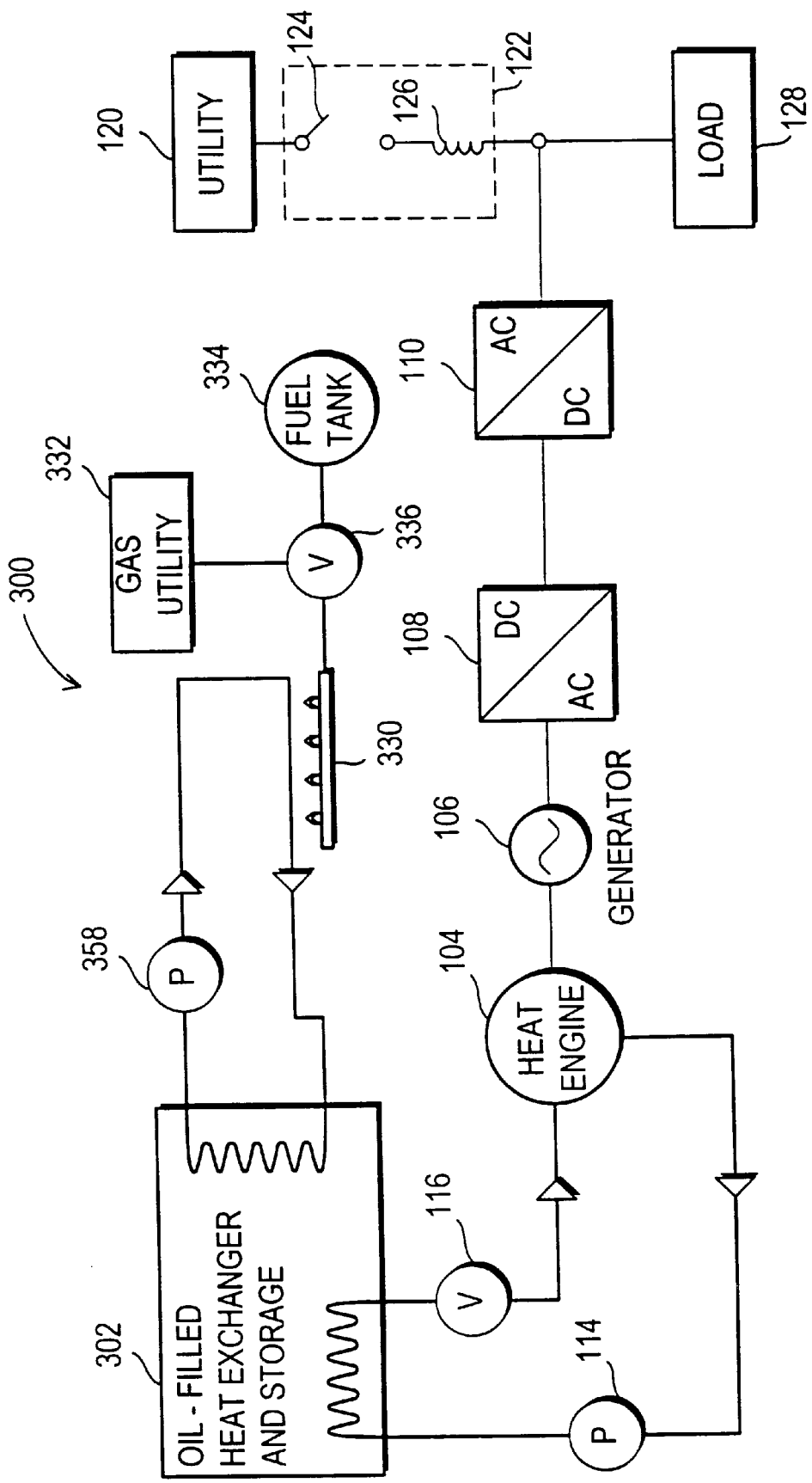
FIG. 3 is a schematic diagram of another UPS that includes a thermal energy source constructed in accordance with the principles of the present invention.

FIG. 3 shows a configuration of a thermal energy source-based UPS 300 that provides an alternate way of heating the fluid in the heat exchanger. Rather than utilizing resistor 118 as described for hot tank assembly 102, hot tank assembly 302 utilizes a second closed-loop pipe that, in this case, preferably contains a fluid such as oil. The fluid is heated by burners 330, which burn fuel such as natural gas provided by, for example, gas utility 332 or storage tank 334 (through valve 336). The heated oil is pumped through the closed-loop by pump 338 so that the piping, which is immersed in hot tank assembly 302, conveys thermal energy to the fluid contained in hot tank assembly 302.

The intensity of burners 330 and the flow rate of the oil may be varied so that the fluid in hot tank assembly 302 is maintained at a relatively constant temperature. Alternatively, burners 330 may be configured such that they heat the vessel of hot tank assembly 302 directly, thereby obviating the need for a second closed loop system. One advantage of UPS 300 over UPS 100 and UPS 200 is that UPS 300 could potentially run indefinitely, provided that the supply of fuel is maintained. Moreover, even if the supply of fuel runs out, UPS 300 then provides backup power for approximately the same amount of time as UPS 100 and UPS 200.

Figure 4:
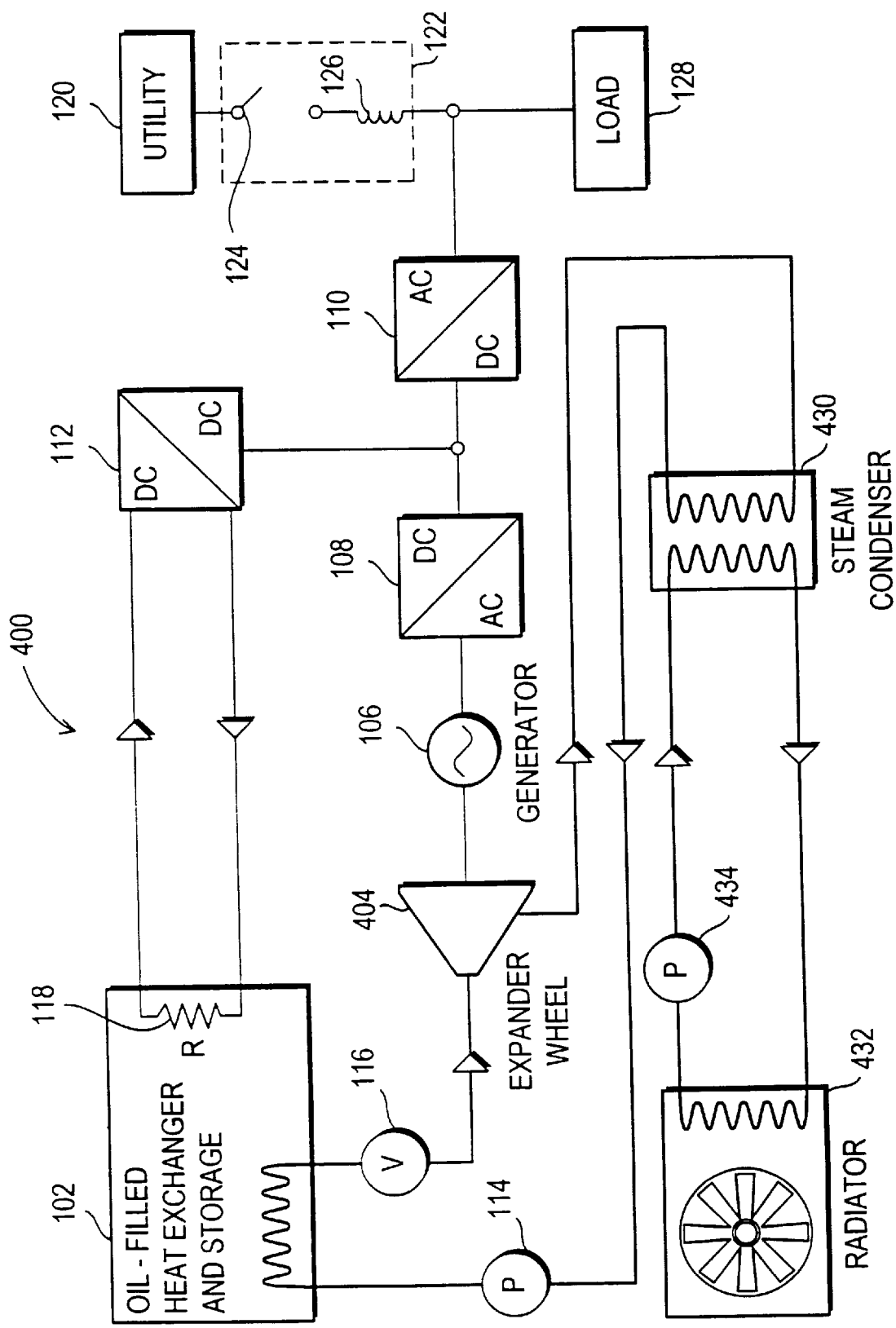
FIG. 4 is a schematic diagram of another UPS that includes a thermal energy source constructed in accordance with the principles of the present invention.

FIG. 4 shows another configuration of a thermal energy storage-based UPS 400. UPS 400 is similar to UPS 100, in that resistor 118 is used to heat the fluid in hot tank assembly 102 and that regulation circuitry 122 is used to provide AC power to UPS 400 from utility 120 (although, persons skilled in the art will appreciate that the additional converter of FIG. 2 could instead be used). FIG. 4 shows a specific configuration for the heat engine as expander wheel 404. Additionally, UPS 400 may include steam condenser 430 and radiator 432, which are coupled together via a second closed-loop pipe. Fluid, preferably water, is pumped through the second closed-loop pipe by pump 434, as described below.

UPS 400 becomes engaged when there is an outage in power from utility 120. At that time, water is pumped through the first closed-loop pipe by pump 114 so that the water is in thermal contact with the heated oil in hot tank assembly 102. The heated oil causes the water to be heated above its boiling point into steam that is passed through valve 116 and is ejected into expander wheel 404. As the steam passes through expander wheel 404, it expands from high to low pressure, which drives the turbine of expander wheel 404. The rotation of expander wheel 404 in turn drives high speed generator 106 which produces AC power. The AC power is fed into converter 108 which converts it to DC and feeds the DC buss. Some of the DC power may be fed back through DC-to-DC converter 112 to heat resistor 118 and thus regulate expander wheel rotational speed, while most the remaining power is converted to AC power by converter 110 and fed to load 128.

The low pressure steam that is ejected from expander wheel 404 is relatively cool. It travels from expander wheel 404 to steam condenser 430 for additional cooling. Condenser 430, which may also include a cool liquid reservoir (not shown), is kept cool by radiator 432 via the second closed-loop pipe and pump 434. The condensed steam, which may now be water, is returned to hot tank assembly 102 as described above to continue the energy conversion process until power is restored from utility 120. As described with respect to FIG. 1, switch 124 remains OPEN while UPS 400 provides backup power to load 128. Once primary power is restored, switch 124 is closed.

Figure 5:
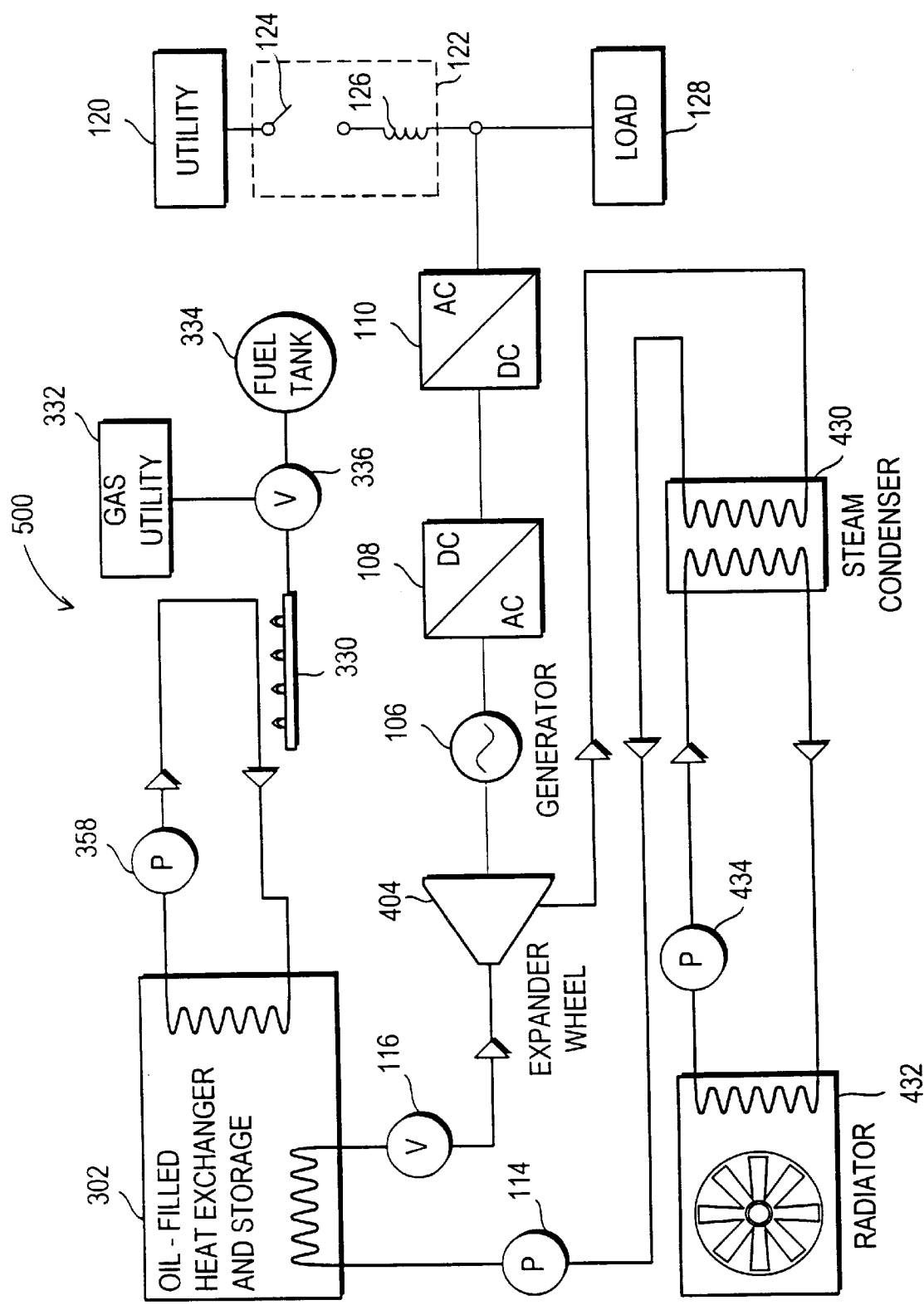
FIG. 5 is a schematic diagram of another UPS that includes a thermal energy source constructed in accordance with the principles of the present invention.

FIG. 5 shows an additional configuration of a thermal energy storage-based UPS 500 that utilizes components from UPS 100, UPS 300 and UPS 400. The primary difference between UPS 500 and the previously described systems is that UPS 500 utilizes the single converter of UPS 100, the gas-fired burner heater of UPS 300 and the expander wheel/condenser/radiator of UPS 400. Persons skilled in the art will appreciate that, just as is illustrated in FIG. 5, various different configurations utilizing the principles of the present invention are possible, including those described herein as well as others. For example, UPS 500 could instead be configured as a two-converter system instead of the single converter shown.

Figure 6A:
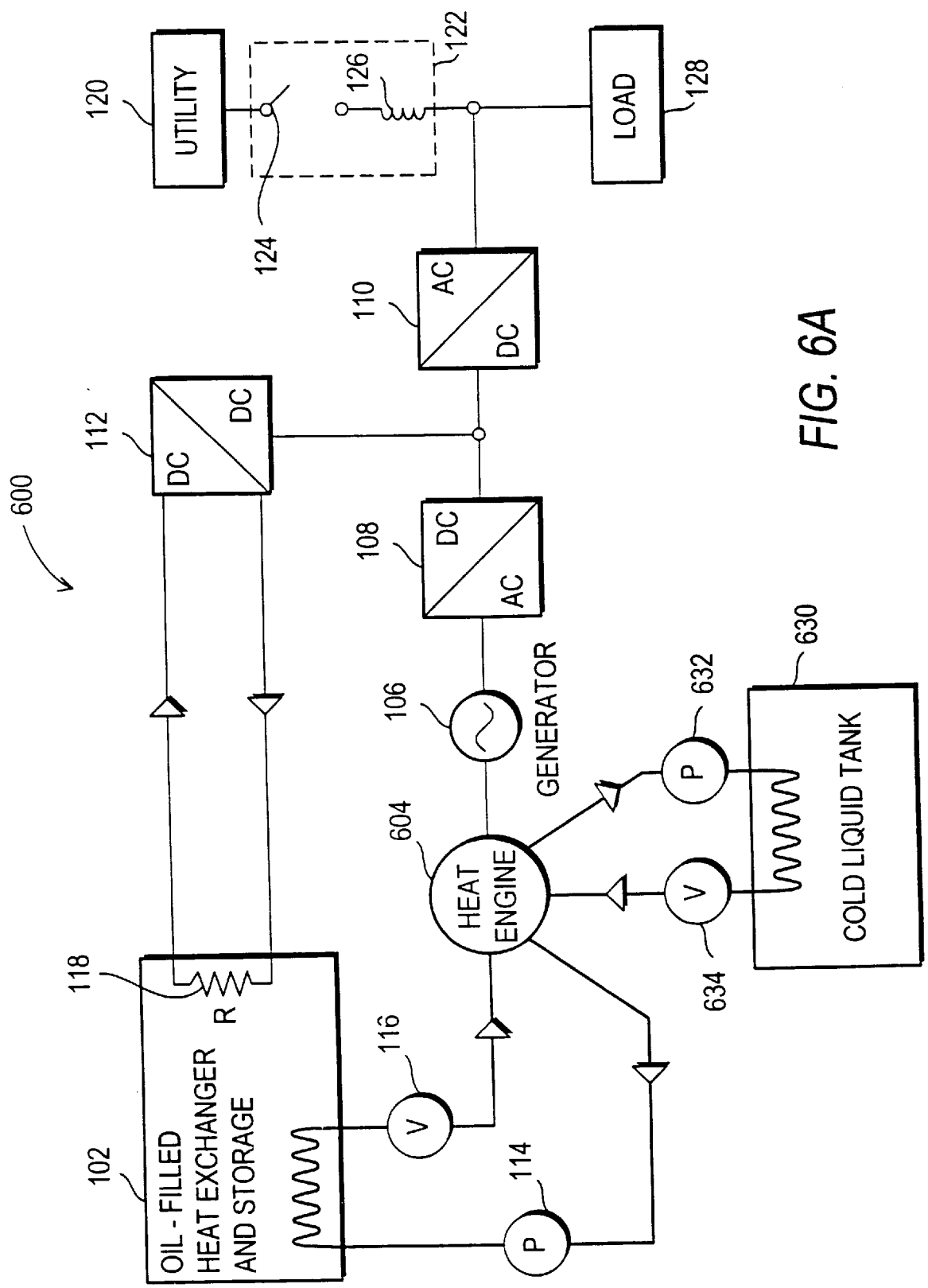
FIGS. 6A–6C are schematic diagrams of other UPSs that includes a thermal energy source constructed in accordance with the principles of the present invention.

FIG. 6A shows an example of a thermal energy storage-based UPS 600 that is configured to provide backup energy for a limited amount of time, for example, such as only twenty minutes or so. Under such circumstances, it may be more economical and less complex to replace the condenser/radiator units with a simple cool tank assembly 630 (which, as described above for the hot tank assembly, may be a thermal energy storage tank—except in this case, cool liquid is stored—combined with an integral heat exchanger).

Figure 7:
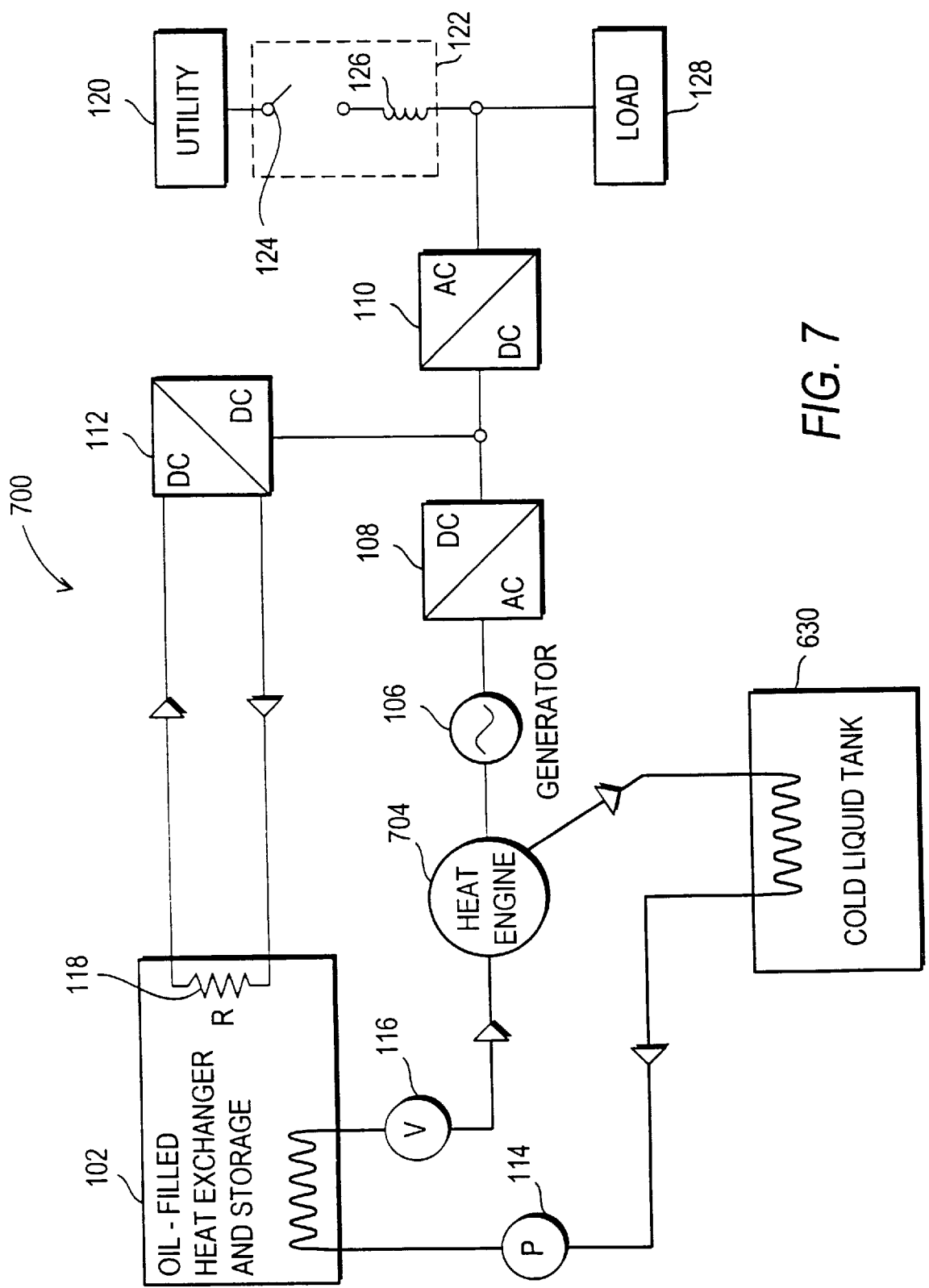
FIG. 7 is a schematic diagram of another UPS that includes a thermal energy source constructed in accordance with the principles of the present invention.

Heat engine 604, preferably a stirling engine, is then provided with a secondary inlet and outlet that feeds the low temperature liquid to cool tank assembly 630 via pump 632. The flow rate also is controlled by valve 634 such that the now cooled water is passed back to heat engine 604. Cool tank assembly 630 may be a simple tank with coils of thermally conductive tubing (e.g., copper tubing) that provide a large area for heat exchange to occur. Alternatively, as shown by UPS 700 in FIG. 7, the closed-loop containing the steam/water may be a single path that runs from hot tank assembly 102, through valve 116 to heat engine 704 and on to cool tank assembly 630, where it returns directly to hot tank assembly 102 through pump 114.

Figure 6B:
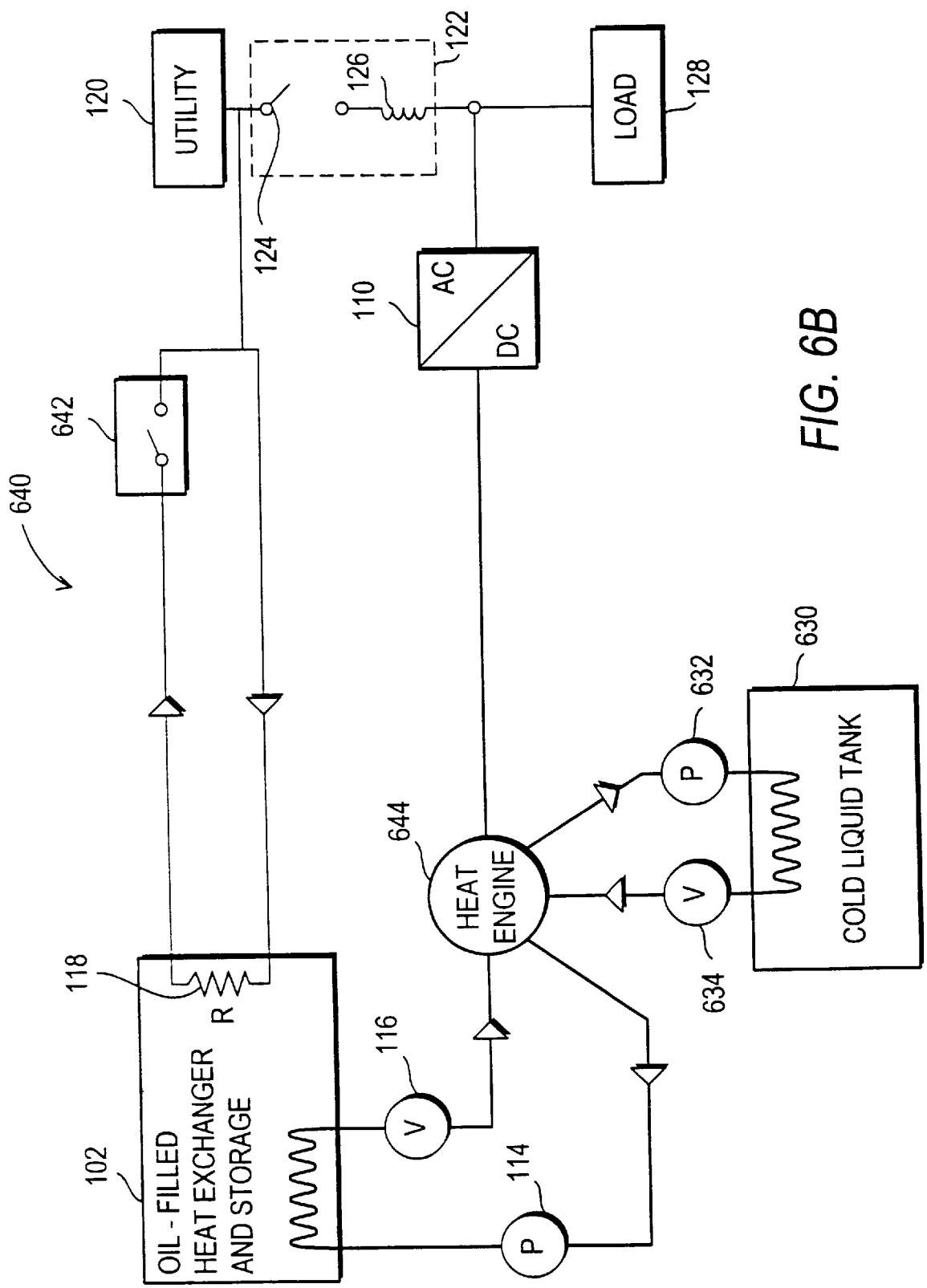

FIG. 6B shows another slight variation on the UPS designs previously described. Persons skilled in the art will appreciate that principles described with respect to FIG. 6B may be equally applied to many of the figures discussed above. FIG. 6B shows UPS 640, which is substantially similar to UPS 600 of FIG. 6A. There are two main differences between UPS 600 and UPS 640. The first difference is that UPS 640 utilizes heat engine 644 instead of heat engine 604. Heat engine 644 is a thermionic or thermoelectric heat engine that, as described above, produces DC power directly from the thermal energy. Accordingly, generator 106 and AC-to-DC converter 108 are eliminated.

In addition, there is a direct connection from utility power 120 to heater resistor 118 so that DC-to-DC converter 112 may be eliminated. Instead of converter 112, however, switch 642 is used to limit the amount of current that flows through resistor 118. Switch 642 may be, for example, a back-to-back thyristor rather than the expensive, transistor-based, converter 112.

Figure 6C:
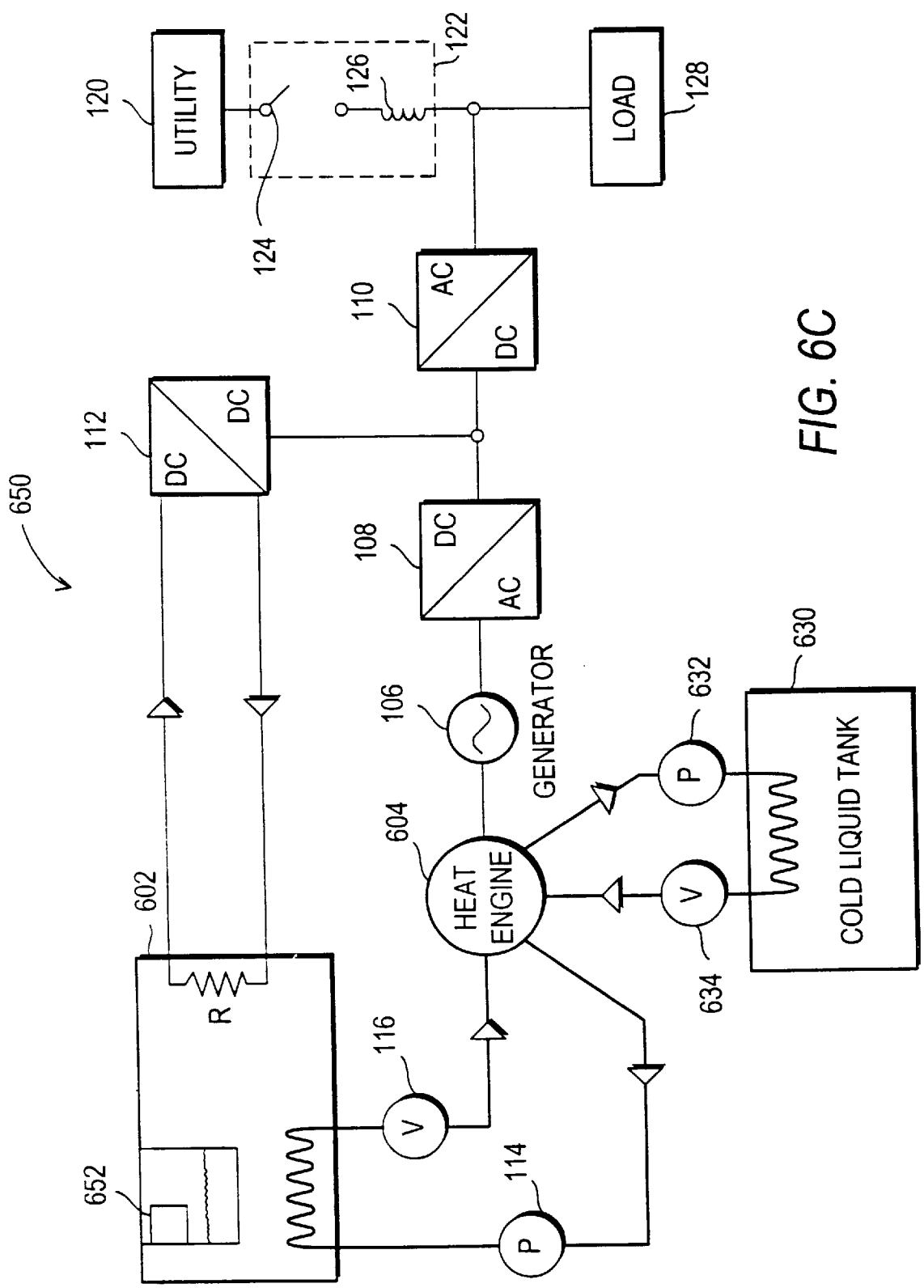

Another variant of UPS 600 is shown in FIG. 6C as UPS 650. Persons skilled in the art will appreciate that principles described with respect to FIG. 6C also may be equally applied to many of the figures discussed above. UPS 650 is substantially similar to UPS 600, except that hot tank assembly 102 is replaced with hot tank assembly 602. Hot tank assembly 602 is similar to hot tank assembly 102 in that it includes a vessel containing fluid that is heated to store thermal energy. In addition, both hot tank assemblies 102 and 602 include an integral heat exchanger that transfers the stored thermal energy to heat engine 604. Hot tank assembly 602, however, includes an exothermic system 652 that enables UPS 650 to run for an extended period of time. Exothermic reaction of system 652 may be either reversible or irreversible. Exothermic system 652 provides the capability of providing long-term back-up power without the ventilation requirements of a fuel-based heating system.

Exothermic system 652 includes, for example, a thermally conductive tank (such as aluminum) that may be inserted into the primary vessel within hot tank assembly 602. If an outage of primary power extends beyond a certain time period, such as five minutes (and a separate optional diesel-powered genset is not used or does not come on-line), a control signal is provided to exothermic system 652 that causes at least two substances to come into contact with each other resulting in a controlled exothermic reaction. The heat from this reaction heats the thermally conductive tank which heats the fluid in the vessel in hot tank assembly 602. The heat produced by exothermic system 652 lasts until the chemicals are consumed, at which point the insert containing the chemicals could be replaced. Accordingly, such a system could provide back-up power for several days.

Once again, there are a wide number of different configurations available which utilize the principles of the present invention to provide backup power from a thermal energy storage system. The specific configurations vary based on the requirements of the end user, including expected duration as a backup source and power requirements.

Figure 8:
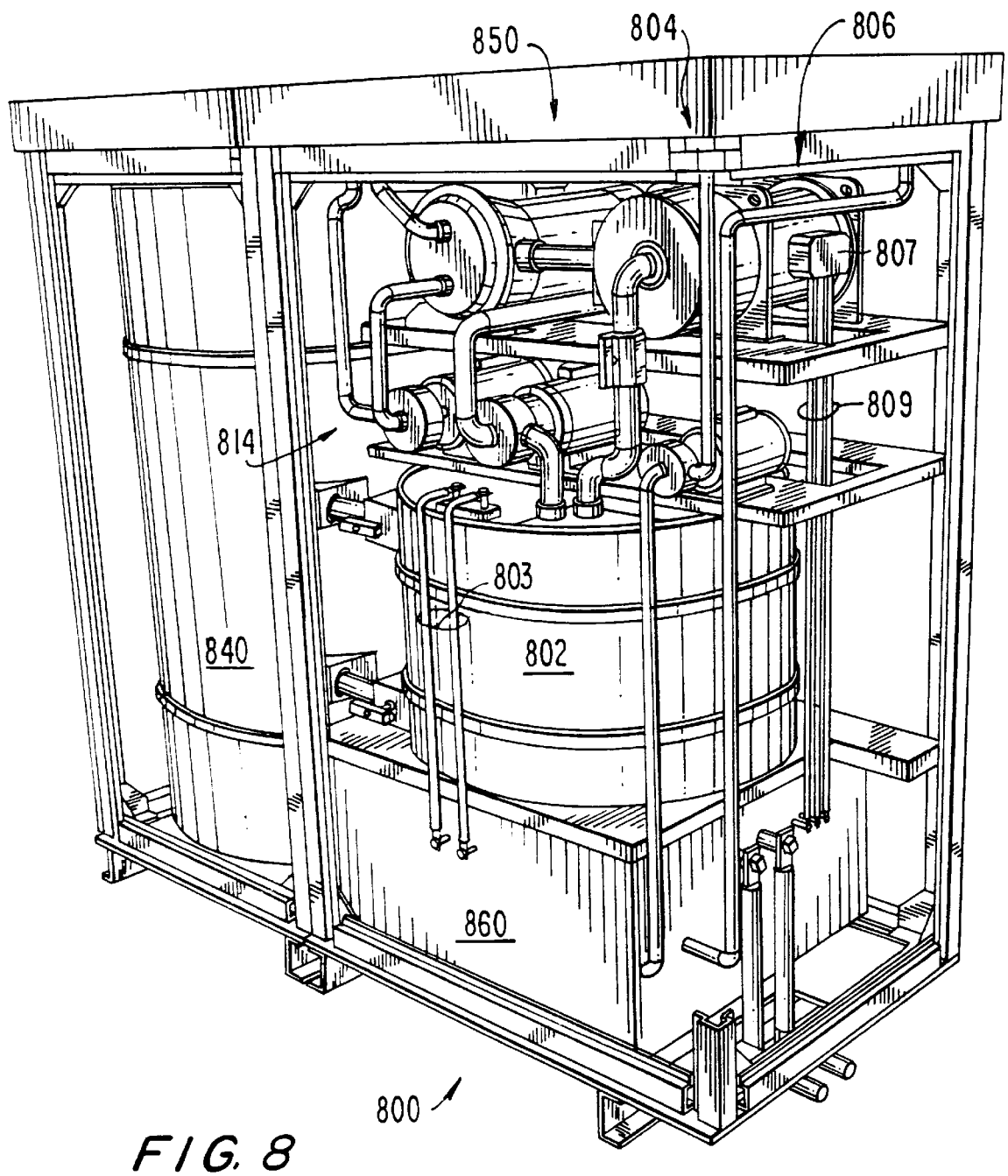
FIG. 8 is a three-dimensional perspective view illustration of a thermal energy source-based UPS constructed in accordance with the principles of the present invention.

FIG. 8 shows a three-dimensional perspective view of an illustration of UPS 800, which could be, for example, an implementation of UPS 400. UPS 800 includes electronics cabinet 860, hot tank assembly 802, expander wheel 804, generator 806, pumps 814, and secondary hot tank assembly 840. The three-phase output 807 of generator 806 is coupled to buss bars 809 that conduct the generator AC power to electronics cabinet 860. Two additional connections 803 that are shown running between electronics cabinet 860 and hot tank assembly 802 provide power to heat the resistor (not shown) immersed in the oil of hot tank assembly 802.

Figure 9:
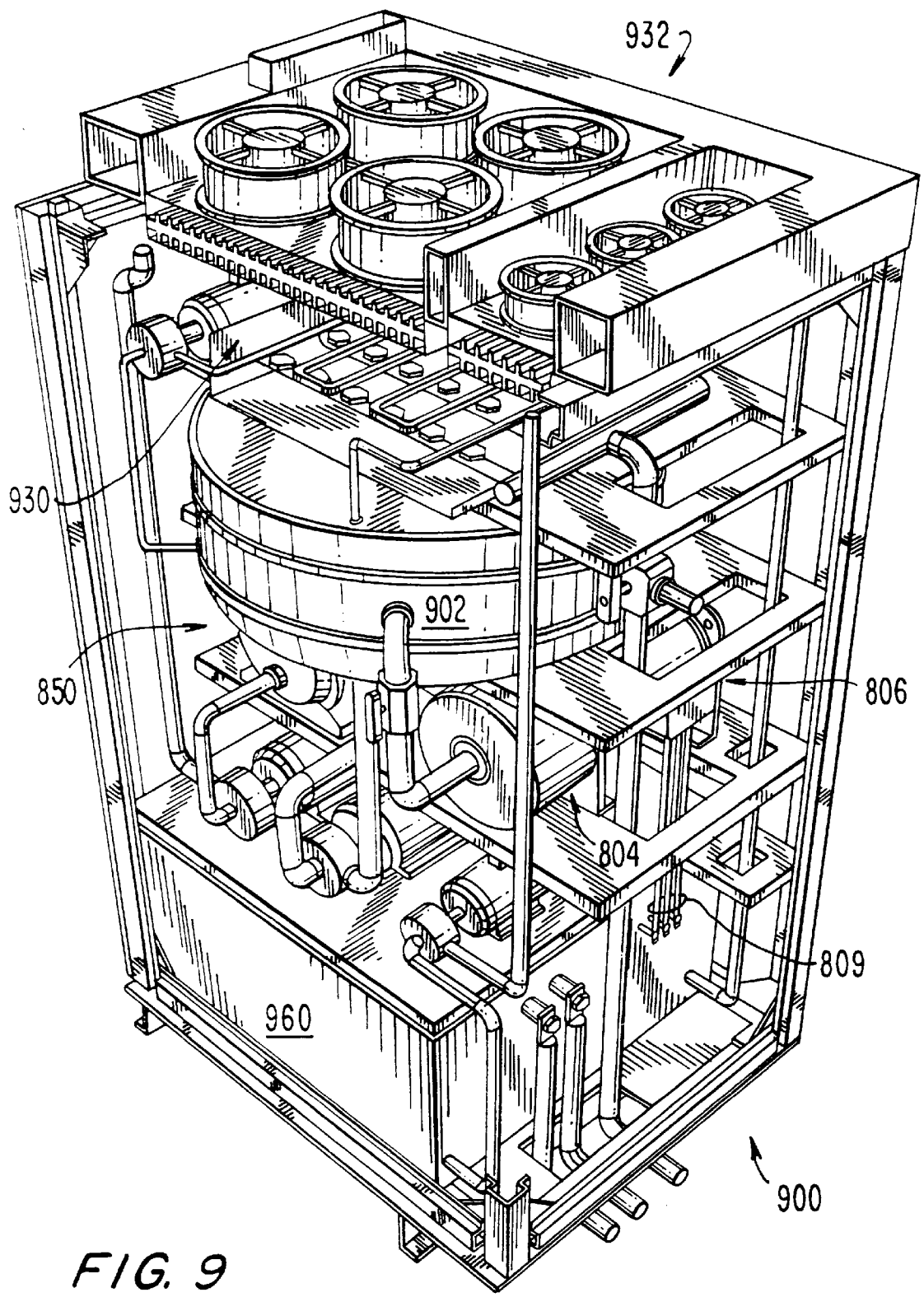
FIG. 9 is a three-dimensional perspective view illustration of another thermal energy source- based UPS constructed in accordance with the principles of the present invention.

Electronic cabinet 860 houses most of the electronics, including, for example, the control systems (not shown) and converters 108, 110, and 112. A condenser 850, which may be similar to the condenser shown in FIGS. 4 and 5, is coupled to expander wheel 804 to receive the relatively cool steam. Above condenser 850 may be a radiator as previously described (such a configuration is illustrated in FIG. 9). Secondary hot tank assembly 840 may be utilized to provide additional runtime for the system without the need for a fuel line.

FIG. 9 shows a three-dimensional perspective view of an illustration of UPS 900, which could be, for example, an implementation of UPS 500 (i.e., a gas fired burner system). UPS 900 includes small hot tank assembly 902, expander wheel 804, generator 806 (coupled to buss bars 809 to conduct the generated power to the electronics), burners 930, radiator 932, condenser 850, and electronics cabinet 960. In this instance, the hot tank may be smaller than that shown in FIG. 8 because the runtime of the system is augmented by an external fuel supply that fires burners 930. Therefore, in such a system, the oil in hot tank assembly 902 will remain relatively hot, even after UPS 900 has been engaged and is providing backup power to the load.

Figure 10:
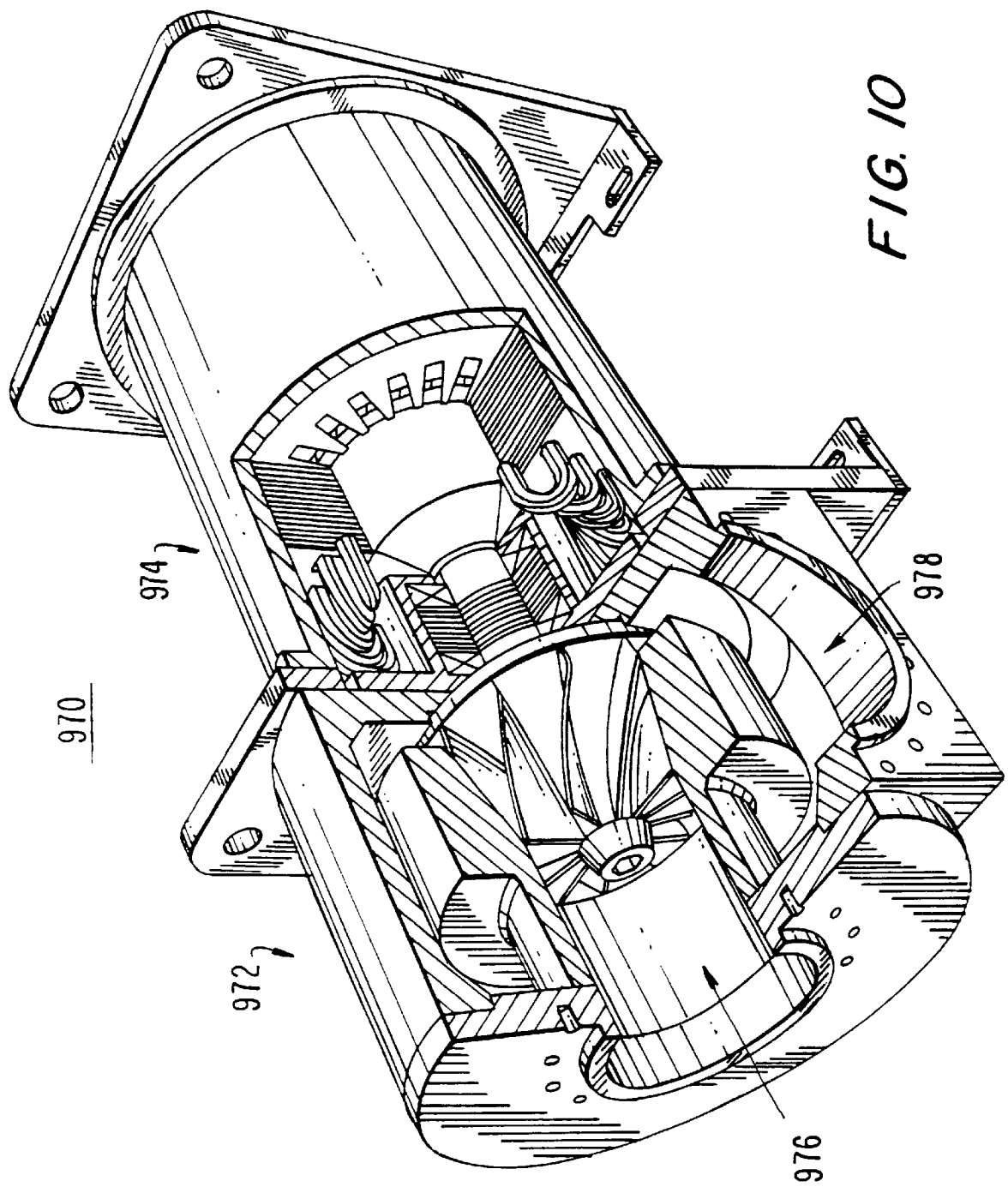
FIG. 10 is a three-dimensional, partial cutaway, perspective view of an expander wheel/generator used in some configurations of the UPSs of the present invention.

FIG. 10 shows a three-dimensional, partial cutaway of an expander wheel/generator system 970 that may be utilized in accordance with the principles of the invention described above. Expander/generator 970 includes turbine section 972 and generator section 974. Steam or any other kind of pressurized gas that has been heated by a heat exchanger is input into turbine section 972 via inlet 976. The steam causes the turbine to rotate which drives generator section 974. The expanded, low pressure, steam exits from the turbine section via outlet 978 for further treatment (e.g., by a condenser and/or cool liquid tank). Generator section 974 includes coils 980 through which the electrical power is induced.

Expander/generator 970 may provide additional advantages by including active magnetic bearings 982 which allow expander section 972 and generator section 974 to spin continuously at high speeds (e.g., from about 20,000 rpm to about 50,000 rpm), without bearing wear. Significantly, the rotational inertia of the expander/generator may be converted to electrical energy to provide a critical load with power while the UPS comes on-line. This time, for example, may be as long as approximately two hundred milliseconds before the valves have been opened. If, however, the expander/generator were not spinning continuously, the UPS would then require several seconds to come on-line—something that typically is unacceptable.

Figure 11:
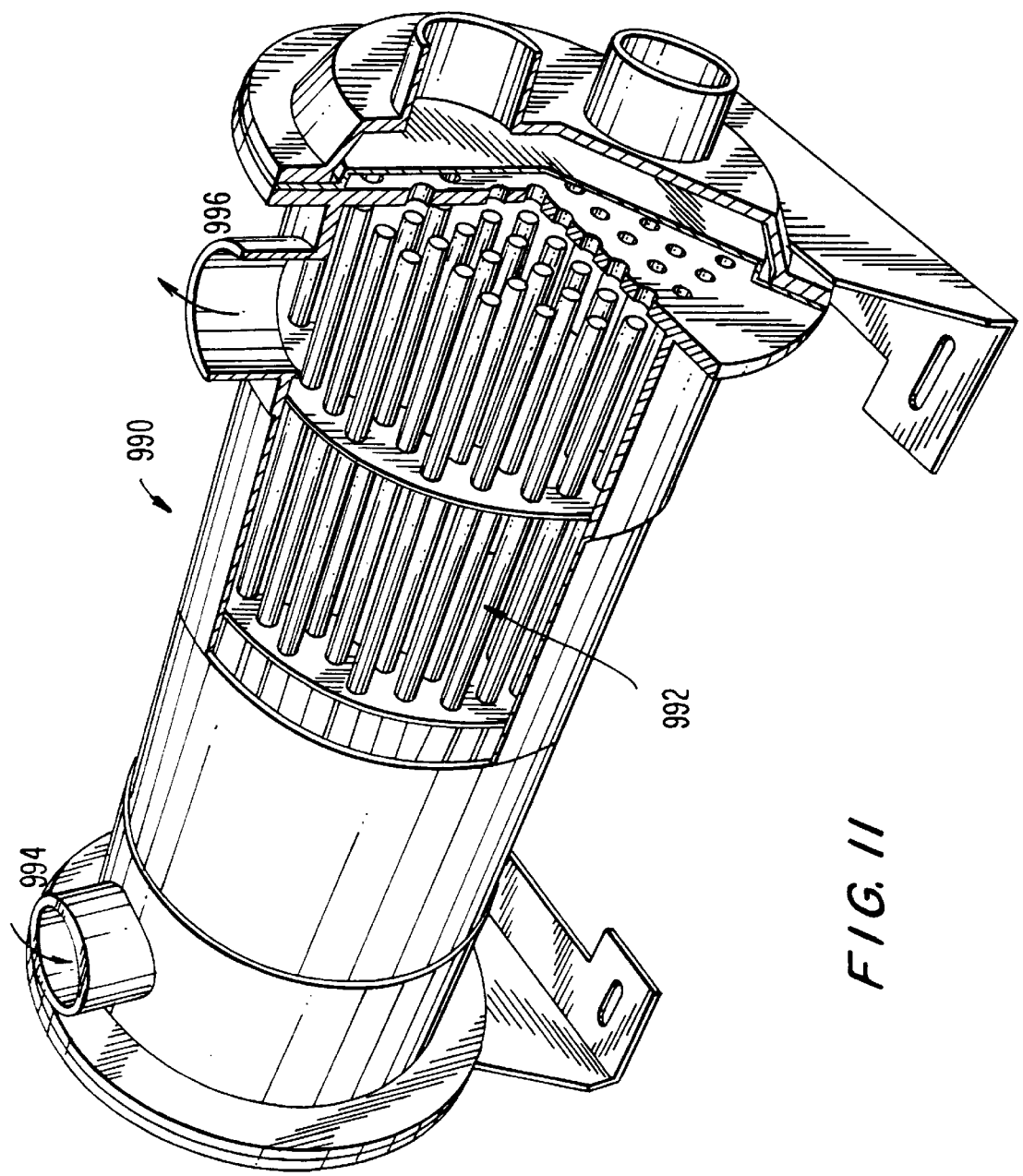
FIG. 11 is a three-dimensional, partial cutaway, perspective view of a steam condenser used in some configurations of the UPSs of the present invention.

FIG. 11 shows a three-dimensional, partial cutaway of a steam condenser 990 that may be utilized in accordance with the principles of the invention described above. Condenser 990 includes thermally conductive tubes 992 that contain cooling fluid. The cooling fluid is pumped in a cyclical manner from condenser 990 to a radiator system (not shown) and back again. The relatively cool steam enters the condenser via inlet 994, where it is further cooled by coming into contact with tubes 992. The cooled steam/water exits via outlet 996 for eventual return to the hot tank assembly.

The reservoir portion of condenser 990 (i.e., the portion surrounding tubes 992) can contain a relatively large amount of cool liquid during standby conditions (i.e., when primary power is available). The reservoir of cool liquid can absorb a substantial amount of heat from the steam, which may reduce the requirements for additional cooling. For example, depending on the application, utilization of the reservoir may enable the use of a substantially smaller radiator, which would return the reservoir to its "cool" state after utility power returns over, for example, a number of hours.

Figure 12:
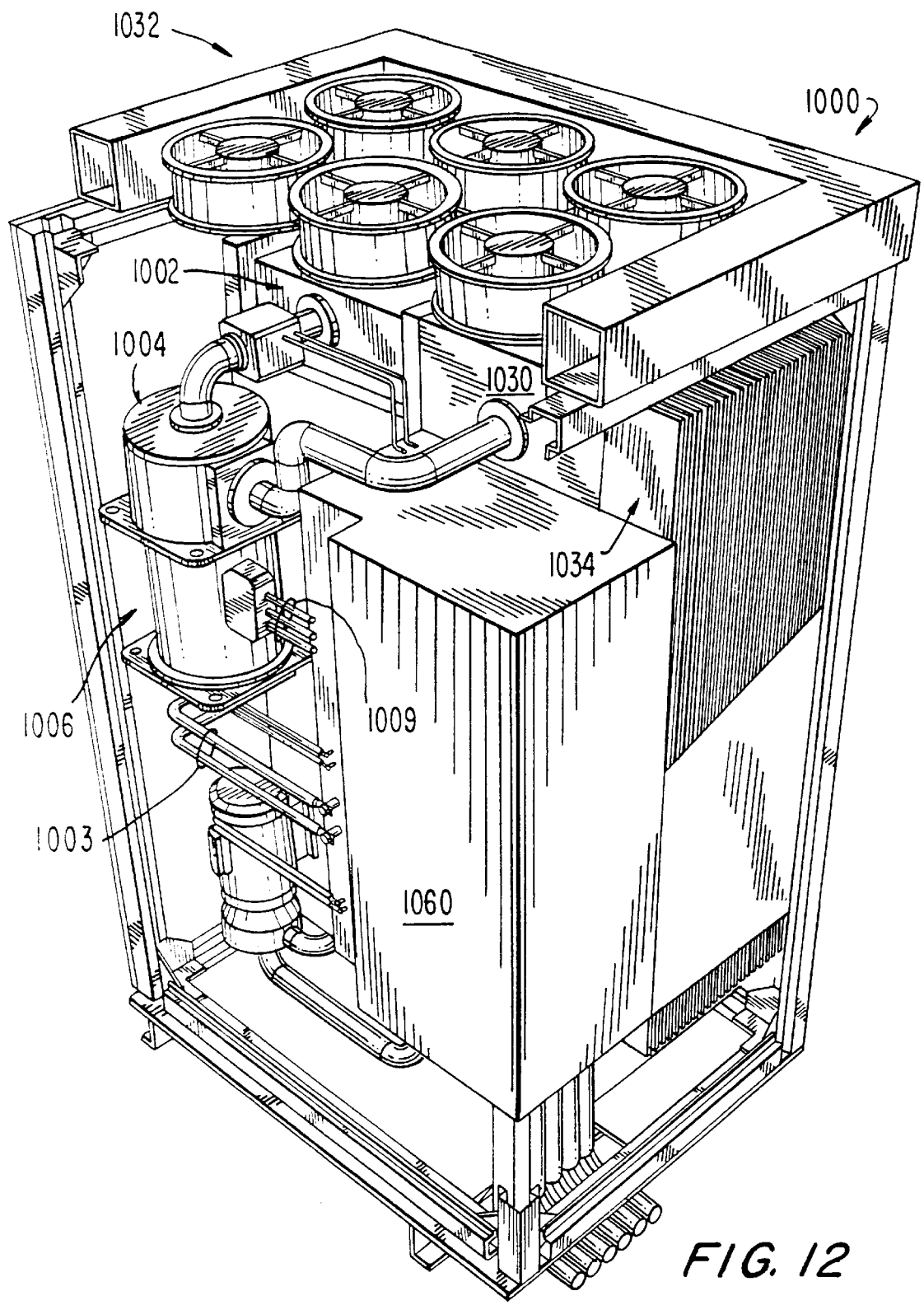
FIG. 12 is a three-dimensional perspective view illustration of another thermal energy source-based UPS constructed in accordance with the principles of the present invention.
Figure 13:
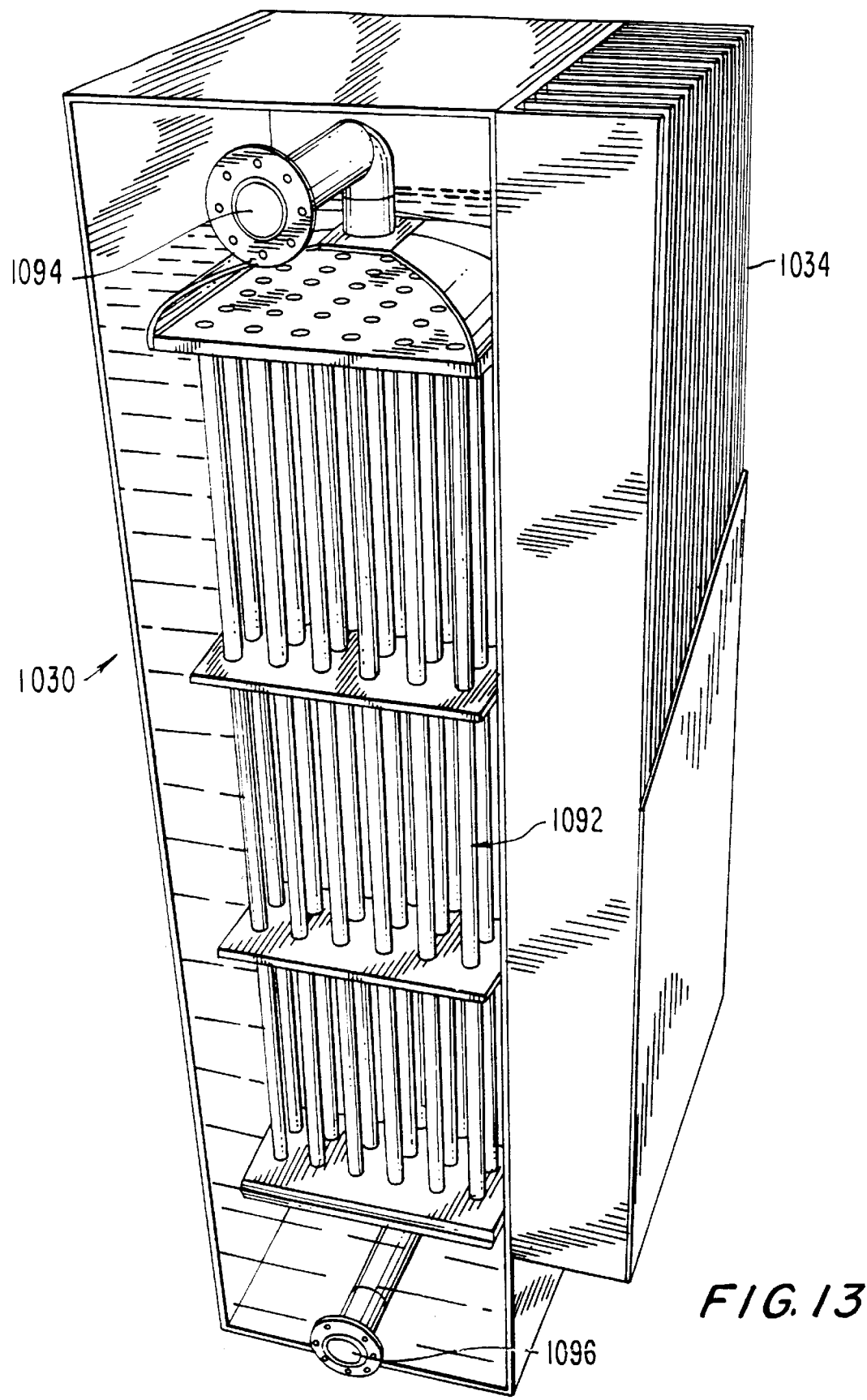
FIG. 13 is a three-dimensional, partial cutaway, perspective view of a cold tank used in some configurations of the UPSs of the present invention.

FIGS. 12 and 13 show three-dimensional, partial cutaway views of thermal energy storage-based UPS 1000, which includes cool tank assembly 1030 instead of a condenser/radiator assembly. UPS 1000 includes rectangular hot tank assembly 1002, expander wheel 1004, generator 1006, buss bars 1003 and 1009, cool tank assembly 1030, fans 1032 (a radiator core is not required for the operation of UPS 1000, but still may be included), and electronics cabinet 1060. Hot tank assembly 1002 and cool tank assembly 1030 are preferably assemblies that include a combined thermal energy storage tank with an integral heat exchanger that respectively provides thermal energy to the UPS or takes it away.

While UPS 1000 operates substantially in the same manner as previously described, UPS 1000 provides the following advantages. As shown in FIGS. 12 and 13, heat sink 1034 is mounted to the side of cool tank assembly 1030. In addition, electronics cabinet 1060 also is in thermal contact with heat sink 1034, as well as being in thermal contact with cool tank assembly 1030.

Cool tank assembly 1030 includes numerous thermally conductive tubes 1092 that are provided with the steam exiting expander wheel 1004 that is cycled through tubes 1092 via inlet 1094 and outlet 1096. This configuration provides a substantial increase in cooling capacity, as well as eliminates the need for a separate radiator and radiator water pump. Moreover, the rectangular orientation of each of the cabinets enables cool tank assembly 1030 to act as a thermal sink for electronics cabinet 1060.

It will be understood that the foregoing is only illustrative of the principles of the invention, and that various modifications can be made by those skilled in the art without departing from the scope and spirit of the invention.

What is claimed is:

1. An uninterruptible power supply (UPS) that provides backup power to a load in the event of a loss of power from a primary source of power, said UPS comprising:
    a material that may be heated to provide a source of stored thermal energy;
    a heater system that heats said material; and
    a conversion system coupled to said source of stored thermal energy, said conversion system converting said stored thermal energy into electrical energy upon said loss of primary power so that said conversion system provides electrical energy to said load.

2. The UPS of claim 1, wherein said material is a liquid stored in a tank.

3. The UPS of claim 2, wherein said liquid is oil.

4. The UPS of claim 1, wherein said material transitions from a liquid to a solid following said loss of primary power.

5. The UPS of claim 4, wherein said material is aluminum.

6. The UPS of claim 1, wherein said material is a solid mass of material.

7. The UPS of claim 6, wherein said solid mass of material is a block of iron.

8. The UPS of claim 1, wherein heater system maintains said source of-stored thermal energy at an elevated temperature while primary power is available.

9. The UPS of claim 1, wherein said heater system is powered by said primary source of power.

10. The UPS of claim 1, wherein said heater system is powered by fuel-fired burners.

11. The UPS of claim 10, wherein said fuel-fired burners are supplied with fuel from a fuel utility.

12. The UPS of claim 1, wherein said source of stored thermal energy is heated by an exothermic reaction system.

13. The UPS of claim 1, wherein conversion system comprises a thermionic generator.

14. The UPS of claim 13, wherein conversion system further comprises a DC-to-AC converter coupled between said generator and said load.

15. The UPS of claim 1, wherein conversion system comprises a thermoelectric generator.

16. The UPS of claim 15, wherein conversion system further comprises a DC-to-AC converter coupled between said generator and said load.

17. The UPS of claim 1, wherein conversion system comprises:
    a steam engine coupled to said source of stored thermal energy; and
    an electrical generator coupled to said steam engine.

18. The UPS of claim 17, wherein conversion system further comprises an AC-to-DC converter coupled between said generator and said load.

19. The UPS of claim 18, wherein conversion system further comprises a DC-to-AC converter coupled between said AC-to-DC converter and said load.

20. The UPS of claim 17, wherein said steam engine is an expander wheel.

21. The UPS of claim 1, wherein conversion system recomprises a stirling engine coupled to said source of stored thermal energy; and
    an electrical generator coupled to said stirling engine.

22. The UPS of claim 21, wherein conversion system further comprises an AC-to-DC converter coupled between said generator and said load.

23. The UPS of claim 22, wherein conversion system further comprises a DC-to-AC converter coupled between said AC-to-DC converter and said load.

24. The UPS of claim 1 further comprising:
    a condenser coupled to said conversion system.

25. The UPS of claim 24 further comprising:
    a radiator coupled to said condenser.

26. The UPS of claim 1 further comprising:
    a cool tank assembly coupled to said conversion system.

27. The UPS of claim 26, wherein said cool tank assembly is coupled to a heat sink.

28. The UPS of claim 1, wherein said conversion system comprises:
    a generator; and
    active magnetic bearings coupled to said generator to enable said generator to rotate at high speeds in STANDBY mode.

29. An uninterruptible power supply (UPS) that provides backup power to a load in the event of a loss of power from a primary source of power, said UPS comprising:
    a source of stored thermal energy;
    a heater system that heats said source of stored thermal energy while in STANDBY mode;
    an exothermic heating system coupled to said source of stored thermal energy, said exothermic heating system operating to heat said source of stored thermal energy once a predetermined period of time after said loss of power has occurred; and
    a conversion system coupled to said source of stored energy, said conversion system converting said stored thermal energy into electrical energy upon said loss of primary power so that said conversion system provides electrical energy to said load.

30. The UPS of claim 29, wherein said exothermic heating system utilizes an irreversible exothermic chemical reaction.

31. An uninterruptible power supply (UPS) that provides backup power to a load in the event of a loss of power from a primary source of power, said UPS comprising:

a material that may be heated to provide a source of stored thermal energy;

a heater system that heats said material;

a heat engine coupled to said source of stored thermal energy, said heat engine converting said stored thermal energy into mechanical energy upon said loss of primary power; and a generator that produces electrical energy from said mechanical energy and provides said produced electrical energy to said load.

32. A method of providing a secondary source of power to a load in the event of a loss of power from a primary source of power, said method comprising the steps of:

heating a material to a predetermined temperature to provide a source of stored thermal energy;

detecting a loss of primary power;

converting said stored thermal energy to electrical energy; and providing said electrical energy to said load.

33. The method of claim 32, wherein said source of stored thermal energy comprises a resistor immersed in a fluid, said step of heating comprising the step of:

providing electrical energy to said resistor directly from said source of primary power.

34. The method of claim 32, wherein said source of stored thermal energy comprises a resistor immersed in a fluid, said step of heating comprising the step of:

providing electrical energy to said resistor indirectly from said source of primary power.

35. The method of claim 32, wherein said material comprises a fluid, step of heating comprising the step of:

heating said fluid by external fuel burners.

36. The method of claim 35, wherein said source of stored thermal energy further comprises:

a fuel line coupled to a fuel utility.

37. The method of claim 32, wherein said material comprises a solid mass of material.

38. The method of claim 37, wherein said solid mass of material comprises a-block of iron.

39. The method of claim 37, wherein said step of heating comprises the step of:

providing electrical energy to a resistor in thermal contact with said solid mass of material.

40. The method of claim 32, wherein said step of heating comprises the step of:

causing at least two substances to come into contact to produce an exothermic reaction, said exothermic reaction heating said source of thermal energy.

41. The method of claim 32, wherein said step of converting said thermal energy comprises the steps of:

providing a thermally conductive pipe immersed in a first fluid in said source of thermal energy, said thermally conductive pipe containing a second fluid that is substantially cooler than said first fluid;

pumping said second fluid through said pipe so that pressure of said second fluid is increased; and generating electrical energy by reducing said pressure of said second fluid.

42. The method of claim 41, wherein said step of generating electrical energy produces AC power, step of providing comprises the steps of:

converting said AC power to DC power; and converting said DC power to AC power and providing said converted AC power to said load.

43. The method of claim 41, wherein the step of generating electrical energy comprises the steps of:

rotating a generator; and causing said generator to spin fast enough so that the stored kinetic energy can provide backup power to said load for less than 1 second.

44. The method of claim 43 further comprises the step of:

rotating said generator in STANDBY mode using active magnetic bearings.

45. The method of claim 32, further comprising the step of:

converting power from said primary source of power to DC power.

46. The method of claim 41, wherein said step of converting said thermal energy further comprises the step of:

pumping said second fluid through a condenser to further cool said second fluid.

47. The method of claim 46, wherein said step of converting said thermal energy further comprises the step of:

coupling a radiator to said condenser to cool said condenser.

48. The method of claim 41, wherein said step of converting said thermal energy further comprises the step of:

pumping said second fluid through a cool tank assembly to further cool said second fluid.

49. The method of claim 48, wherein said step of converting said thermal energy further comprises the step of:

coupling said cool tank assembly to a heat sink to cool said cool tank assembly.

* * * * *

UNITED STATES PATENT AND TRADEMARK OFFICE
CERTIFICATE OF CORRECTION

PATENT NO. : 6,192,687 B1
DATED : February 27, 2001
INVENTOR(S) : Joseph F. Pinkerton et al.

It is certified that error appears in the above-identified patent and that said Letters Patent is hereby corrected as shown below:

Title page,
ABSTRACT,
Line 6, change "containing, water for example," to -- containing water, for example, --;

Column 2,
Line 6, change "Celsius" to -- C --;
Line 7, change "Celsius" to -- C --;
Line 29, change "steam, however," to -- steam; however, --;

Column 3,
Line 35, change "source– based" to -- source-based --;
Line 57, change "components," to -- components; --;

Column 10,
Line 23, change "recomprises a stirling" to -- comprises: a stirling -- (new paragraph);

Column 11,
Line 41, change "a-block" to -- a block --.

Signed and Sealed this

Eleventh Day of December, 2001

Attest:

NICHOLAS P. GODICI
*Attesting Officer*    *Acting Director of the United States Patent and Trademark Office*